United States Patent
Nishio (10) Patent No.: US 6,776,440 B2
(45) Date of Patent: Aug. 17, 2004

(54) METHOD AND STRUCTURE FOR PREVENTING SLIPPING-OFF OF A TUBE IN A PIPE JOINT MADE OF RESIN

(75) Inventor: Kiyoshi Nishio, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 10/155,055

(22) Filed: May 24, 2002

(65) Prior Publication Data
US 2002/0180211 A1 Dec. 5, 2002

(30) Foreign Application Priority Data
Jun. 1, 2001 (JP) ........................................ 2001-166385

(51) Int. Cl.⁷ .............................................. F16L 25/00
(52) U.S. Cl. ..................... 285/331; 285/247; 285/334.5
(58) Field of Search ................. 285/247, 251, 285/331, 354, 386, 384, 389, 385, 334.5

(56) References Cited

U.S. PATENT DOCUMENTS

| | | | | |
|---|---|---|---|---|
| 3,269,756 A | * | 8/1966 | Bloom | ........................ 285/247 |
| 4,500,118 A | * | 2/1985 | Blenkush | ...................... 285/247 |
| 5,370,424 A | * | 12/1994 | Wendorff | .................. 285/332.4 |
| 5,388,871 A | * | 2/1995 | Saitoh | ......................... 285/247 |
| 6,007,112 A | * | 12/1999 | Kim | ......................... 385/334.5 |
| 6,601,879 B2 | * | 8/2003 | Donoho et al. | .......... 285/334.5 |

FOREIGN PATENT DOCUMENTS

JP S7-20471 5/1995

* cited by examiner

Primary Examiner—Lynne H. Browne
Assistant Examiner—Aaron Dunwoody
(74) Attorney, Agent, or Firm—Koda & Androlia (57) ABSTRACT

A structure for preventing slipping-off of a tube in a pipe joint made of resin in which a union nut (2) is fastened to a joint body (1) to cause a pressing edge portion (19a) of the union nut (2) to abut against a diameter-increased root portion (17) of a tube (3), thereby pressing one end of the tube (3) toward the joint body (1), a recess (20) is previously shaped in the diameter-increased root portion (17) of the tub (3), the recess being smaller in radius of curvature or angle than the diameter-increased root portion, and the pressing edge portion (19a) of the union nut (2) is then caused to abut against the recess (20).

6 Claims, 7 Drawing Sheets

PRIOR ART

METHOD AND STRUCTURE FOR PREVENTING SLIPPING-OFF OF A TUBE IN A PIPE JOINT MADE OF RESIN

BACKGROUND OF THE INVENTION

1. Field of the Invention

The present invention relates to a method and structure for preventing slipping-off of a tube in a pipe joint made of resin, and more particularly to a method and structure for preventing slipping-off of a tube in a pipe joint made of resin which is preferably used in piping for a liquid having high purity or ultrapure water to be handled in a production process in, for example, production of semiconductor devices, production of medical equipment and medicines, food processing, and chemical industry.

2. Description of the Prior Art

Figure 8:
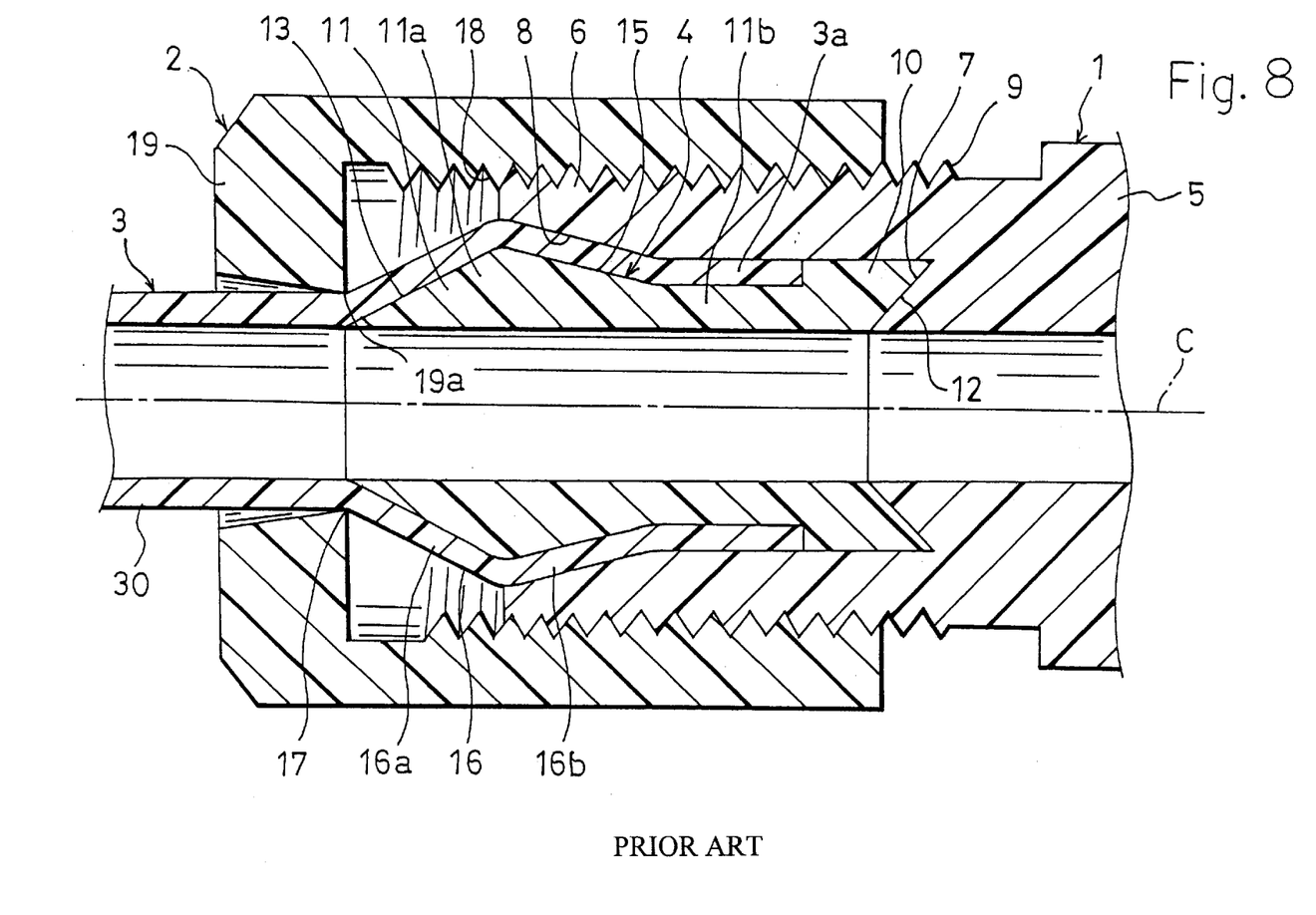
FIG. 8 is a half-section view of a state where one end portion of a tube is connected to a pipe joint made of resin of a conventional art example.

As a pipe joint made of resin of this kind, for example, known is a pipe joint shown in FIG. 8 (for example, Japanese Utility Model Publication No. 7-20471). The pipe joint made of resin comprises a joint body 1 and a union nut 2 which are made of resin such as fluororesin having excellent heat resistance and chemical resistance. An inner ring 4 is pressingly inserted into one end portion 3a of a tube 3 which is to be inserted into joint body 1 to be connected thereto, and which is the made of resin such as fluororesin.

In the joint body 1, a receiving port 6 is formed at least in one end of a cylindrical body portion 5, a first primary sealing portion 7 is formed in an inner area of the receiving port 6 so that the sealing portion intersects the axis C of the joint body 1, and a secondary sealing portion 8 is formed in an entrance area of the receiving port 6 so that the sealing portion intersect the axis C. An external thread portion 9 is formed on the outer periphery of the receiving port 6. The inner diameter of the receiving port 6 is larger than that of the body portion 5. In the inner area of the receiving port 6, the first primary sealing portion 7 is formed by a tapered face which is smaller in diameter as further moving toward the outer side in the axial direction and then reaches the inner radial face of the body portion 5. On the other hand, the secondary sealing portion 8 is formed by a tapered face which is larger in diameter as further moving from the inner area of the receiving port 6 toward the outer side in the axial direction and then reaches the end face of the receiving port 6.

The inner ring 4 is a molded piece of resin such as fluororesin. In the inner ring, a protruding portion 10 having an outer diameter that allows the portion to be fitted into the receiving port 6 of the joint body 1 is formed in an inner end portion in the axial direction, and a press insertion portion 11 which is to be pressingly inserted into the one end portion 3a of the tube 3 is formed in an outer end portion in the axial direction, thereby shaping the inner ring into a sleeve-like shape as a whole. An inner end sealing portion 12 which abuts against the first primary sealing portion 7, and which is configured as a tapered face is formed in the inner end face of the protruding portion 10. The press insertion portion 11 consists of a bulge portion 11a, and a connecting portion 11b which connects the bulge portion 11a to the protruding portion 10. The outer diameter of the connecting portion 11b is set to be smaller than that of the protruding portion 10 by a degree corresponding to the thickness of the tube 3. The bulge portion 11a is formed into a mountain-like section shape having: a tapered outer end sealing portion 13 which is larger in diameter as further moving from the outer end in the axial direction and toward the inner side; and a tapered face 15 which is smaller in diameter as further moving from the apex of the outer end sealing portion 13 toward the connecting portion 11b. The outer diameter of the apex of the outer end sealing portion 13, i.e., the maximum outer diameter of the bulge portion 11a is set to be larger than the outer diameter of the connecting portion 11b. The tapered face 15 is formed so that the inclination angel is substantially equal to that of the secondary sealing portion 8 of the joint body 1, and, when the inner end sealing portion 12 abuts against the primary sealing portion 7, the gap through which the secondary sealing portion 8 is opposed to the tapered face 15 corresponds to the thickness of the tube 3. The inner diameter of the inner ring 4 is set to be equal to or substantially equal to the inner diameters of the tube 3 and the body portion 5 of the joint body 1, so as not to impede movement (flow) of a fluid.

The inner ring 4 is pressingly inserted into the one end portion 3a of the tube 3 under a state where the protruding portion 10 is outwardly projected, whereby the diameter of the one end portion 3a of the tube 3 is increased to form a diameter-increased portion 16, and also to form a diameter-increased root portion 17 in a place where an opposite-insertion direction side inclination 16a of the diameter-increased portion 16 on the side opposite to the direction of insertion into the joint body 1, and a tube outer face 30 which is parallel to the tube axial direction meet each other.

Under the state where the one end portion 3a of the tube 3 is inserted into the receiving port 6, the inner end sealing portion 12 abuts against the first primary sealing portion 7 of the joint body 1, and the outer end sealing portion 13 abuts against the inner face of the opposite-insertion direction side inclination 16a serving as a second primary sealing portion of the diameter-increased portion 16 of the tube 3. The one end portion 3a of the tube 3 is clamped in an inclined state between the secondary sealing portion 8 of the joint body 1 and the tapered face 15 of the inner ring 4. Namely, an insertion direction side inclination 16b of the diameter-increased portion 16 of the tube 3 which is deformed along the tapered face 15 of the inner ring 4 abuts against the secondary sealing portion 8.

In the union nut 2, an internal thread portion 18 which is to be screwed to the external thread portion 9 of the joint body 1 is formed on the inner peripheral face, an annular flange portion 19 is inward projected from one end, and a pressing edge portion 19a of an acute angle or a right angle is formed on the inner end in the axial direction of the inner peripheral face of the flange portion 19.

Under the state where the one end portion 3a of the tube 3 into which the inner ring 4 is pressingly inserted is inserted into the receiving port 6 of the joint body 1, the internal thread portion 18 of the union nut 2 which is previously loosely fitted onto the outer periphery of the one end portion 3a is screw-fastened to the external thread portion 9 of the joint body 1. As a result of this fastening, the pressing edge portion 19a of the union nut 2 abuts against the diameter-increased root portion 17 of the diameter-increased portion 16 of the tube 3 to press the inner ring 4 in the axial direction. As a result, the inner end sealing portion 12 of the inner ring 4, and the insertion direction side inclination 16b of the tube 3 are pressingly contacted with the primary sealing portion 7 of the receiving port 6 of the joint body 1 and the secondary sealing portion 8 of the tube 3, respectively, and the inner face of the opposite-insertion direction side inclination 16a serving as the second primary sealing portion of the tube 3 is pressingly contacted with the outer end sealing portion 13 of the inner ring 4, whereby the sealing property (sealing force) is exerted and at the same time the tube 3 is prevented from slipping off.

In the pipe joint made of resin in which the fastening of the union nut 2 causes the pressing edge portion 19a to abut against the diameter-increased root portion 17 of the diameter-increased portion 16 of the tube 3, thereby pressing the one end portion 3a of the tube 3 together with the inner ring 4 against the joint body 1, the diameter-increased root portion 17 of the diameter-increased portion 16 of the tube 3 is simply rounded in a gentle manner. Therefore, sliding of the pressing edge portion 19a occurs. Particularly, the union nut 2 and the tube 3 which are made of fluororesin have a low coefficient of friction, and hence easily slide. Consequently, these components exert a small resistance against pulling-out of the tube 3, and there is the possibility that the tube slips off. In order to increase the pulling resistance of the tube 3, the union nut 2 is firmly fastened, and the force of pulling the tube 3 is maintained by the fastening force.

With respect to the pulling resistance against the fluid pressure which is applied to the tube 3 in a usual use, the above-mentioned structure of a pipe joint does not cause any problem. In the case where the temperature of transported fluid exceeds a usual service temperature, the case where an abnormal fluid pressure is applied to the tube under severe service conditions in which the fluid pressure is very higher than that in a usual use, or the case where a mechanical pulling force other than the internal pressure is abnormally applied to the tube, it is critically important to ensure the safety particularly in transportation of hazardous chemicals. In the above-mentioned structure of a pipe joint made of resin, the pulling resistance of the tube 3 depends on the fastening force of the union nut 2. In this situation, a safety problem may be caused when the fastening force is lowered due to an error in an initial working process or changes with time. It is very important to consider the problems.

SUMMARY OF THE INVENTION

It is an object of the invention to provide a method and structure for preventing slipping-off of a tube in such a pipe joint made of resin in which means for preventing slipping-off of the tube is improved so that, even when an abnormal fluid pressure or an abnormal mechanical pulling force other than the internal pressure is applied to the tube, the function of preventing slipping-off of the tube, and the sealing function can be sufficiently exerted to ensure the safety.

Hereinafter, the method and structure for preventing slipping-off of a tube in a pipe joint made of resin according to the invention will be described with reference to the accompanying drawings. In the following description, the reference numerals are used in order to facilitate the understanding of the invention. The use of the reference numerals is not intended as restricting the invention to the illustrated example.

In the method of preventing slipping-off of a tube in a pipe joint made of resin according to the invention, a joint body (1) which has a receiving port (6) in one end portion, and in which an external thread portion (9) is disposed on an outer periphery of the receiving port; a tube (3) made of resin; and a union nut (2) which is loosely fitted onto an outer periphery of the tube, and in which an internal thread portion (18) that is to be screwed to the external thread portion (9) of the joint body (1) is disposed on an inner periphery, an annular flange portion (19) that is inward projected is disposed on one end, and a pressing edge portion (19a) is disposed in an inner diameter portion of the flange portion are prepared. One end portion of the tube (3) is inserted into the receiving port (6) of the joint body (1) in a state where a diameter-increased portion (16) is formed and a diameter-increased root portion (17) where an opposite-insertion direction side inclination (16a) of the diameter-increased portion meets a tube outer face (30) which is parallel to an axial direction of the tube is formed. The internal thread portion (18) of the union nut (2) is screw-fastened to the external thread portion (9) to cause the pressing edge portion (19a) to abut against the diameter-increased root portion (17) of the tube (3), thereby pressing the one end portion of the tube (3) toward the joint body (1). Before the union nut (2) is fastened, a recess (20) is previously shaped in the diameter-increased root portion (17) of the tube (3) against which the pressing edge portion (19a) is to abut, the recess being smaller in radius of curvature or angle than the diameter-increased root portion.

In a preferred embodiment, in the method of preventing slipping-off of a tube according to the invention, the diameter-increased portion (16) of the tube (3) is formed by pressingly inserting an inner ring (4) into the one end portion of the tube (3). Alternatively, the diameter-increased portion (16) of the tube (3) is formed by flaring the one end portion of the tube (3), and pressingly fitted onto an outer periphery of an end portion of the receiving port (6) of the joint body (1), the end portion being more forward than the external thread portion (9). Alternatively, the recess (20) is shaped into a curved portion (21) which is drawn by a radius of curvature that is smaller than a radius of curvature of the diameter-increased root portion (17), or into a corner (22) of an angle that is smaller than an angle of the diameter-increased root portion (17).

In the method of preventing slipping-off of a tube according to the invention, the recess (20) which is smaller in radius of curvature or angle than the diameter-increased root portion (17) of the diameter-increased portion (16) of the tube (3) is previously shaped in the diameter-increased root portion (17), and the pressing edge portion (19a) of the union nut (2) is then caused to abut against the recess. In accordance with the fastening of the union nut (2), therefore, the pressing edge portion (19a) can be always caused to stably and surely abut against and engage with the diameter-increased root portion (17) of the tube (3) without sliding thereover, so that a strong pressing force can be applied. Furthermore, the pulling resistance can be increased independent of the fastening force of the union nut (2). Even when the fastening force of the union nut (2) is lowered due to an error in a working process or changes with time, it is possible to avoid an accident of slipping-off of the tube which is most dangerous.

The structure for preventing slipping-off of a tube in a pipe joint made of resin according to the invention comprises: a joint body (1) which has a receiving port (6) in one end portion, and an external thread portion (9) on an outer periphery of the receiving port; a tube (3) made of resin; and a union nut (2) which is loosely fitted onto the outer periphery of the tube, and in which an internal thread portion (18) that is to be screwed to the external thread portion (9) of the joint body (1) is disposed on an inner periphery, an annular flange portion (19) that is inward projected is disposed on one end, and a pressing edge portion (19a) is disposed in an inner diameter portion of the flange portion. One end portion of the tube (3) is inserted into the receiving port (6) of the joint body (1) in a state where a diameter-increased portion (16) is formed and a diameter-increased root portion (17) where an opposite-insertion direction side inclination (16a) of the diameter-increased portion meets a tube outer face (30) which is parallel to an axial direction of the tube is formed. A recess (20) is shaped in the diameter-increased root portion (17) of the tube (3), the recess being smaller in radius of curvature or angle than the diameter-increased root portion. The internal thread portion (18) of the union nut (2) is screw-fastened to the external thread portion (9) to cause the pressing edge portion (19a) to abut against the recess (20) of the tube (3), thereby pressing the one end portion of the tube (3) toward the joint body (1).

In a preferred embodiment, in the structure for preventing slipping-off of a tube according to the invention, the diameter-increased portion (16) of the tube (3) is formed by pressingly inserting an inner ring (4) into the one end portion of the tube (3). Alternatively, the diameter-increased portion (16) of the tube (3) is formed by flaring the one end portion of the tube (3), and pressingly fitted onto an outer periphery of an end portion of the receiving port (6) of the joint body (1), the end portion being more forward than the external thread portion (9). Alternatively, the recess (20) is shaped into a curved portion (21) which is drawn by a radius of curvature that is smaller than a radius of curvature of the diameter-increased root portion (17), or into a corner (22) of an angle that is smaller than an angle of the diameter-increased root portion (17).

In the structure for preventing slipping-off of a tube according to the invention, the recess (20) which is smaller in radius of curvature or angle than the diameter-increased root portion (17) of the diameter-increased portion (16) of the tube (3) is shaped in the diameter-increased root portion (17), and the pressing edge portion (19a) of the union nut (2) abuts against the recess. In accordance with the fastening of the union nut (2), therefore, the pressing edge portion (19a) can be always caused to stably and surely abut against and engage with the diameter-increased root portion (17) of the tube (3) without sliding thereover, so that a strong pressing force can be applied. Furthermore, the pulling resistance can be increased independent of the fastening force of the union nut (2). Even when the fastening force of the union nut (2) is lowered due to an error in a working process or changes with time, therefore, it is possible to avoid an accident of slipping-off the tube which is most dangerous.

As described above, according to the invention, the pressing edge portion can be always caused to stably and surely abut against and engage with the diameter-increased root portion of the tube in a slide-proof manner, to exert a strong pressing force, by the simple means in which the recess that is smaller in radius of curvature or angle than the diameter-increased root portion of the tube is shaped in the diameter-increased root portion and the pressing edge portion of the union nut abuts against the recess. Furthermore, the pulling resistance can be increased independent of the fastening force of the union nut. Therefore, the invention attains an effect that, even when the fastening force of the union nut is lowered due to an error in a working process or changes with time, it is possible to avoid an accident of slipping-off of the tube which is most dangerous.

DETAILED DESCRIPTION OF THE PREFERRED EMBODIMENTS

The pipe joint made of resin according to the invention is similar in basic configuration to the above-described pipe joint made of resin shown in FIG. 8, as a whole. Therefore, members and components which are identical with those of the pipe joint made of resin shown in FIG. 8 are denoted by the same reference numerals, and their specific description is omitted. Hereinafter, only portions which are different from the pipe joint made of resin shown in FIG. 8 will be described.

Figure 1:
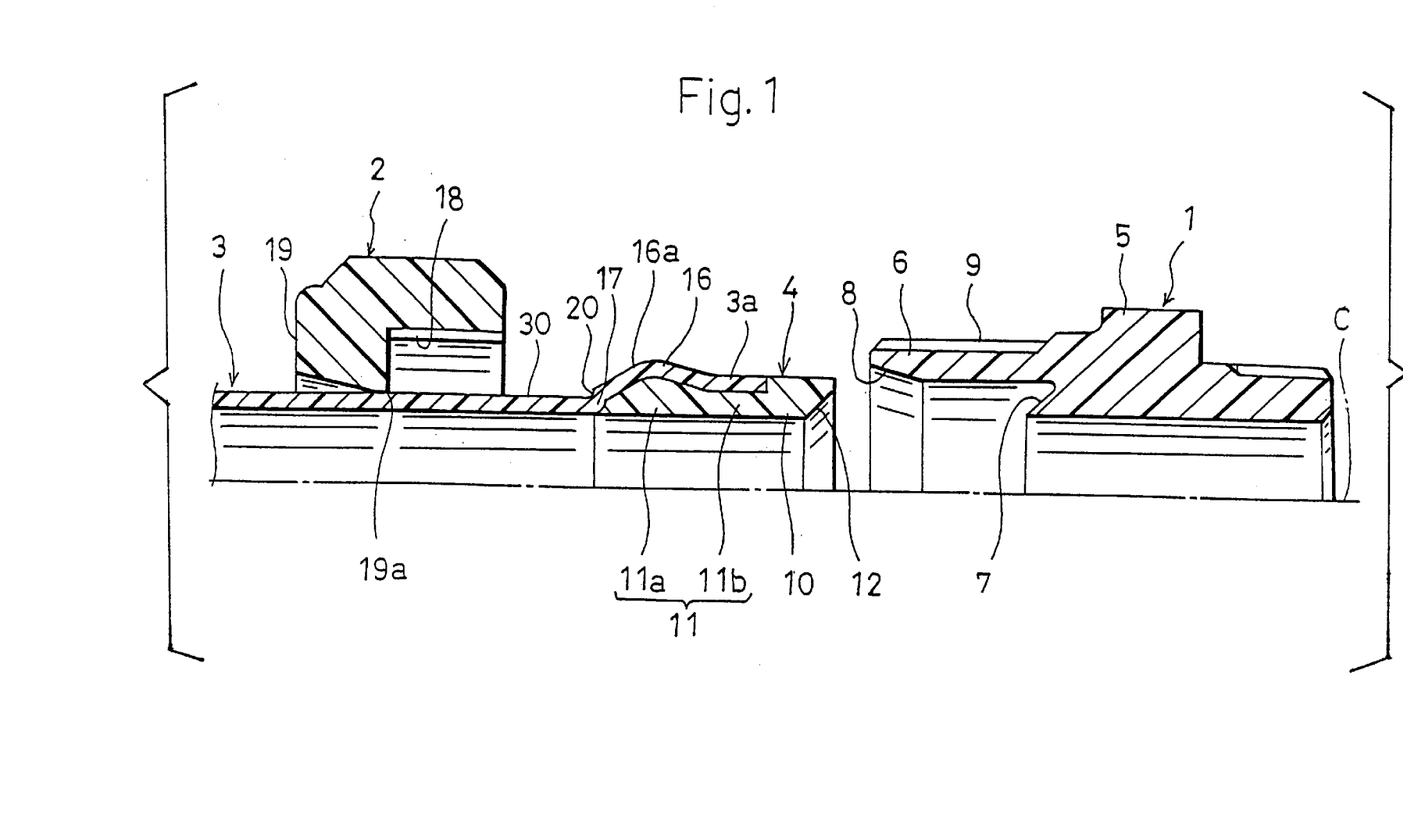
FIG. 1 is a half-section view showing an embodiment of the invention in a state where one end portion of a tube is separated from a pipe joint made of resin.
Figure 2:
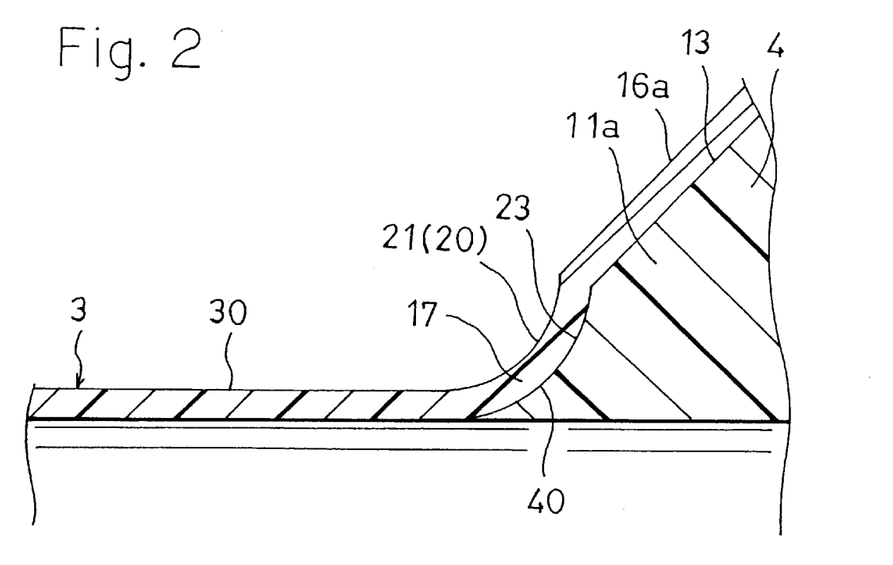
FIG. 2 is an enlarged section view of main portions of the tube shown in FIG. 1.
Figure 3:
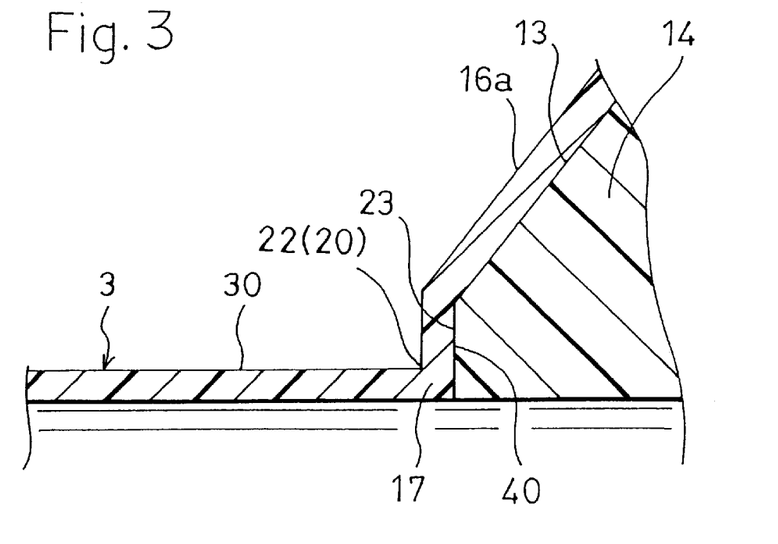
FIG. 3 is an enlarged section view showing another embodiment of the invention in a manner corresponding to FIG. 2.

Referring to FIG. 1, in the whole circumference of the diameter-increased root portion 17 of the diameter-increased portion 16 of the tube 3 in which the diameter-increased portion 16 is formed by the inner ring 4, a recess 20 that is smaller in radius of curvature or angle than the diameter-increased root portion 17 is previously shaped before the tube 3 is inserted into the joint body 1. In this case, as shown in FIG. 2, the recess 20 is shaped into a curved portion 21 which is drawn by a radius of curvature (for example, a radius of 1 mm or less) that is smaller than the radius of curvature of the diameter-increased root portion 17, or, as shown in FIG. 3, into a corner 22 of an angle (in the illustrated example, 90°) that is smaller than the angle (obtuse angle) of the diameter-increased root portion 17. In the case where, as shown in the figures, a projection 40 is formed on the inner face side of the diameter-increased root portion 17 as a result of the shaping of the recess 20 in the diameter-increased root portion 17 of the tube 3, a recess 23 corresponding to the recess 20 of the tube 3 is disposed in an end portion of the bulge portion ha of the inner ring 4 which is opposed to the recess 20, thereby enabling the projection 40 to enter the recess 23.

Figure 7A:
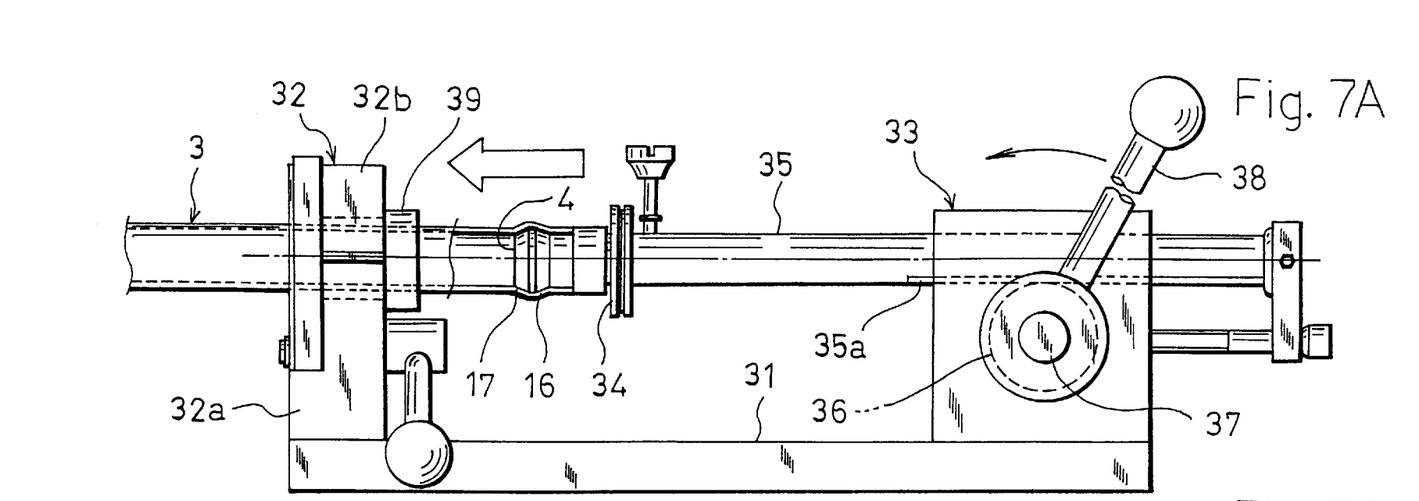
FIG. 7A is a side view of an inner ring press-insertion jig which is used in the invention.

An example of a method of previously shaping the recess 20 in the tube 3 will be described. For example, a jig shown in FIG. 7A is known as a jig for pressingly inserting and fixing the inner ring 4 into one end portion of the tube 3 (for example, see Japanese Utility Model Publication No. 646663). In the method, the inner ring 4 is pressingly inserted into one end portion of the tube 3 by using the inner ring press-insertion jig, and the recess 20 is then shaped in the tube 3 by using the press-insertion jig.

Referring to FIG. 7A, in the inner ring press-insertion jig, a clamping table 32 for fixing and holding one end portion of the tube 3 is disposed in the front end side of a base 31, and a gear box 33 having a function of pressingly inserting the inner ring 4 into the one end portion of the tube 3 is disposed in the rear end side. The clamping table 32 has a half-split structure consisting of a stationary clamp 32a and a movable clamp 32b, and clampingly fixes the one end portion of the tube 3 in a horizontal posture between the stationary clamp 32a and the movable clamp 32b. The gear box 33 comprises: a press insertion member 35 in which a ring holding member 34 for holding the inner ring 4 is attached to the front end, and which is configured by a round shaft having a rack 35*a*; a pinion 36 which meshes with the rack 35*a*; and a press insertion operating lever 38 which is coupled to the pinion 36 via a shaft 37 and the pinion 36 to swing back and forth about the shaft 37.

When an inner ring is to be pressingly inserted, the one end portion of the tube 3 is held and fixed to the clamping table 32, the inner ring 4 is held by the ring holding member 34, and the press insertion operating lever 38 is thereafter swung forth. Then, the press insertion member 35 is advanced via the pinion 36 and the rack 35*a*, so that the inner ring 4 is pressingly inserted into the one end portion of the tube 3. By the press insertion of the inner ring 4, as described above, the diameter-increased portion 16 and the diameter-increased root portion 17 are formed in the tube 3, whereby the process of pressingly inserting the inner ring 4 is ended.

Figure 7B:
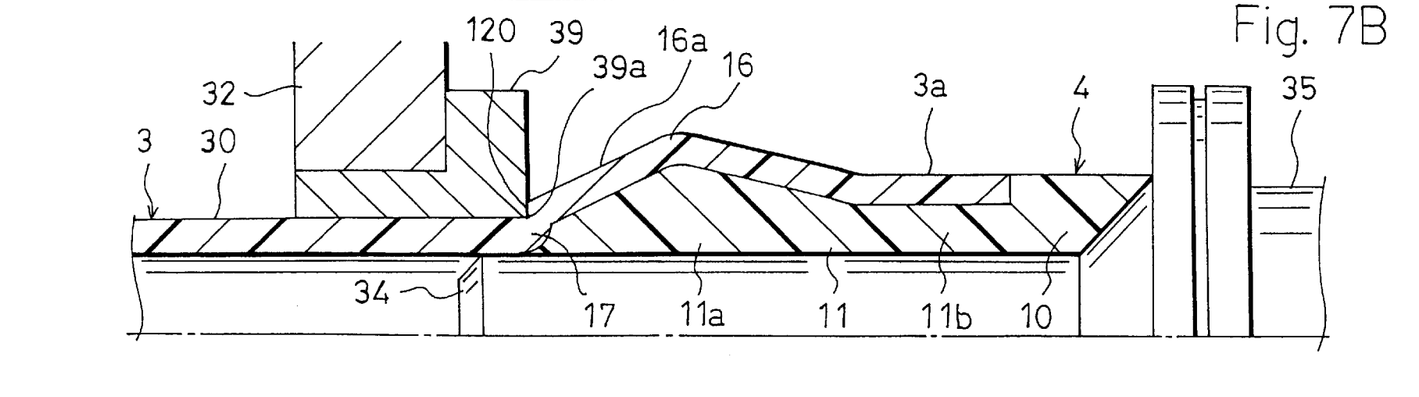
FIG. 7B is a section view showing a state where a recess is shaped in a diameter-increased root portion of a tube by using the inner ring press-insertion jig.

After the process of pressingly inserting the inner ring, a recess shaping jig 39 configured by half rings is set on the clamping table 32, and a portion of the tube 3 into which the inner ring 4 is pressingly inserted is passed through the recess shaping jig 39, the portion being on the side opposite to the inner ring 4. Then, the press insertion operating lever 38 is swung forth to advance the tube 3 together with the inner ring 4, whereby the diameter-increased root portion 17 of the tube 3 is pressed against an edge portion 39*a* of the recess shaping jig 39 as shown in FIG. 7B. As a result, the recess 20 is shaped in the diameter-increased root portion 17 of the tube 3 by the edge portion 39*a* of the recess shaping jig 39. In order to shape more surely the recess 20, preferably, the pressing by the edge portion 39*a* of the recess shaping jig 39 is conducted while heat of about 250 to 350° C. is given by a heat gun or the like to a portion of the tube 3 made of fluororesin where the recess is to be shaped. When the inner ring press-insertion jig is used in this way, the recess 20 can be easily shaped in the diameter-increased root portion 17 of the tube 3.

After the recess is shaped, when the press insertion operating lever 38 is swung back, the press insertion member 35 is retracted via the pinion 36 and the rack 35*a*, and the ring holding member 34 is extracted from the inner ring 4.

As another recess shaping jig, half-split rings (not shown) which can be inserted into the union nut 2 may be used. In this case, the half-split rings have an edge portion which is similar to the edge portion 39*a* of the recess shaping jig 39, and the union nut 2 is firmly fastened to the external thread portion 9 of the joint body 1, whereby the edge portions of the half-split rings are pressed against the diameter-increased root portion 17 of the tube 3 to shape the recess 20. After the shaping, the half-split rings are removed away from the union nut 2.

Figure 4:
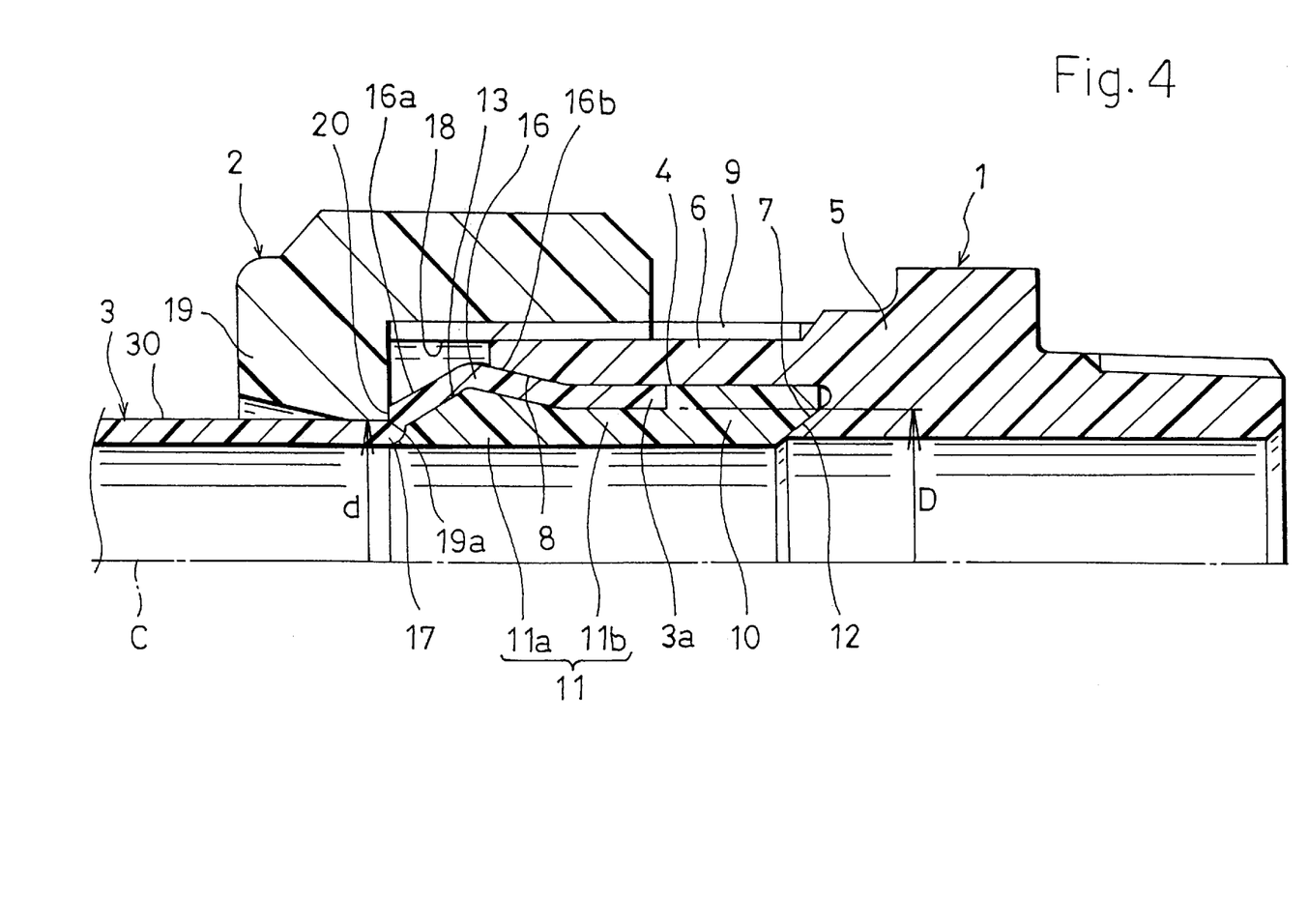
FIG. 4 is a half-section view of a state where the one end portion of the tube is separated from the pipe joint made of resin of FIG. 1.

In the thus configured pipe joint made of resin, as shown in FIG. 4, the one end portion 3*a* of the tube 3 into which the inner ring 4 is pressingly inserted is inserted into the receiving port 6 of the joint body 1, to cause the inner end sealing portion 12 to abut against the primary sealing portion 7. Then, the internal thread portion 18 of the union nut 2 which is previously loosely fitted onto the outer periphery of the one end portion of the tube 3 is screw-fastened to the external thread portion 9 of the joint body 1, and rotated in the fastening direction. As a result of this fastening rotation of the union nut 2, a driving force in the axial direction corresponding to the fastening torque is generated via the internal and external thread portions 18 and 9. Therefore, the pressing edge portion 19*a* of the union nut 2 abuts against the recess 20 of the diameter-increased root portion 17 of the tube 3 to strongly press the inner ring 4 against the joint body 1. At this time, since the recess 20 of the diameter-increased root portion 17 against which the pressing edge portion 19*a* abuts is smaller in radius of curvature or angle than the diameter-increased root portion 17, the pressing edge portion 19*a* stably and surely abuts against and engages with the diameter-increased root portion 17 without sliding thereover. As a result, the pressing edge portion 19*a* of the union nut 2 exerts a strong pressing action to press the diameter-increased portion 16 of the tube 3 and the inner ring 4 against the joint body 1.

By the strong pressing action due to the pressing edge portion 19*a* of the union nut 2, the inner end sealing portion 12 of the inner ring 4 is closely contacted at a high surface pressure with the first primary sealing portion 7 of the joint body 1, and the inner face of the opposite-insertion direction side inclination 16*a* of the tube 3 is closely contacted at a high surface pressure with the outer end sealing portion 13 of the inner ring 4, to provide an airtight seal. Furthermore, the outer face of the insertion direction side inclination 16*b* of the tube 3 is pressingly contacted with the secondary sealing portion 8 of the joint body 1 to exert a sealing function.

The sealing state is held surely and firmly by the configuration in which the pressing edge portion 19*a* of the union nut 2 stably and surely abuts against and engages with the diameter-increased root portion 17 of the tube 3 in a slide-proof manner. Therefore, the pulling resistance of the tube 3 can be increased independent of the fastening force of the union nut 2. In addition to the case of a fluid of the ordinary temperature, even in the case of a fluid of a high temperature and a high pressure, when an abnormal pulling load is applied, therefore, the sealing property can be ensured so that leakage of the fluid or entry of a foreign substance can be surely prevented from occurring, whereby the reliability of the sealing property can be enhanced.

Referring to FIG. 4, in the inner ring 4, the outer diameter of the connecting portion 11*b* which connects the bulge portion 11*a* to the protruding portion 10 is set to be smaller than the maximum outer diameters of the protruding portion 10 and the bulge portion 11*a* by a degree corresponding to the thickness of the tube 3. By contrast, the pressing edge portion 19*a* of the union nut 2 is set to have an inner diameter (radius) d at which the pressing edge portion 19*a* is positioned to be closer to the axis, not only than the apex of the bulge portion 11*a* of the inner ring 4 but also than the outer diameter of the connecting portion 11*b*. When the relationship between the inner diameter (radius) d of the pressing edge portion 19*a* of the union nut 2 and the outer diameter (radius) D of the connecting portion 11*b* of the inner ring 4 is set to be d>D, the pressing action on the first primary sealing portion 7 is weakened also when the union nut 2 is fastened. Therefore, the relationship set as described above is not preferable. By contrast, when the relationship is set to be d≦D, both the contact surface pressure between the first primary sealing portion 7 and the inner end sealing portion 12, and that between the inner face of the opposite-insertion direction side inclination 16*a* serving as the second primary sealing portion and the outer end sealing portion 13 can be increased by the fastening of the union nut 2. Furthermore, the predetermined surface pressures can be generated by a low fastening torque. Therefore, the relationship set as described above is preferable.

Figure 5:
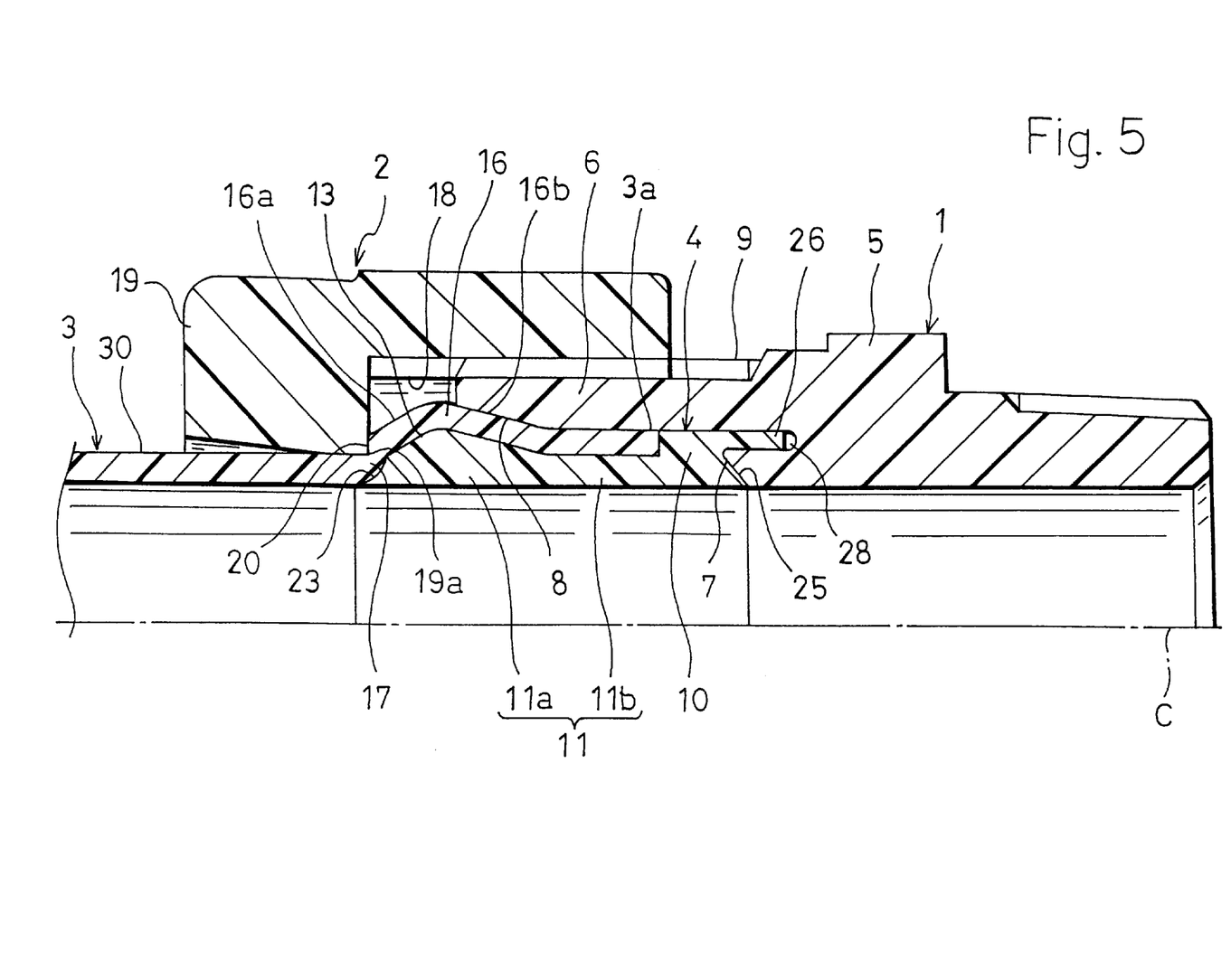
FIG. 5 is a half-section view showing the other embodiment of the invention in a manner corresponding to FIG. 4.
Figure 6:
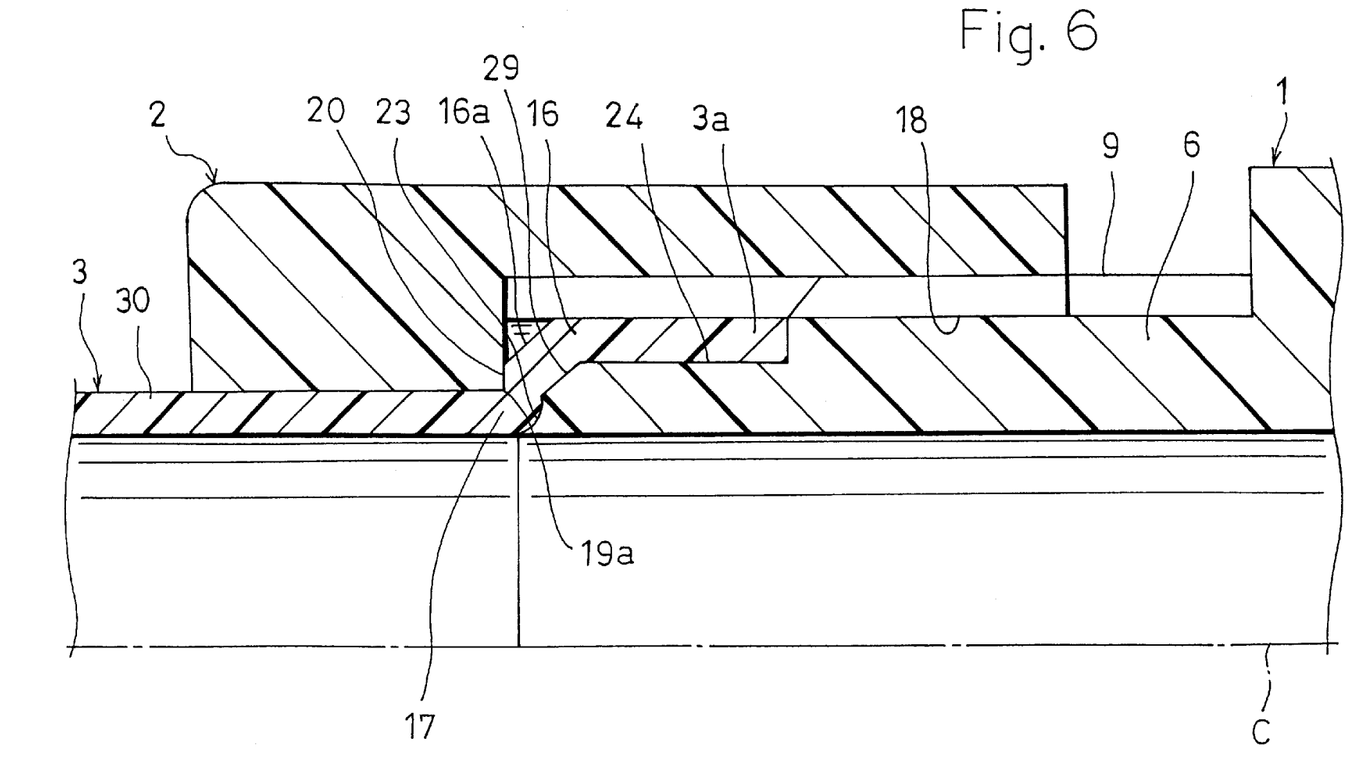
FIG. 6 is a half-section view showing a further embodiment of the invention in a manner corresponding to FIG. 4.

The invention can be similarly applied also to, for example, pipe joints made of resin shown in FIGS. 5 and 6, in addition to the pipe joint made of resin of the embodiment described above.

The pipe joint made of resin shown in FIG. 5 is different from that shown in FIG. 1 in the seal structure of the first primary sealing portion and the vicinity thereof, and substantially identical with that shown in FIG. 1 in the other configuration such as the second primary sealing portion and the secondary sealing portion. Therefore, the identical members and components are denoted by the same reference numerals, and their specific description is omitted. In the vicinity of the first primary sealing portion, a cylindrical sealing portion 26 which is projected more radially outward and axially inward than a protruding inner end face 25 that abuts against the first primary sealing portion 7 in the inner area of the receiving port 6 of the joint body 1 is formed on the protruding portion 10 of the inner ring 4 protruding from the one end portion 3a of the tube 3. A cylindrical groove 28 which generates a radial surface pressure in accordance with press insertion of the cylindrical sealing portion 26 to form the sealing portion is formed more radially outward than the primary sealing portion 7, in the inner area of the receiving port 6 of the joint body 1. The first primary sealing portion 7 is formed by a tapered face which is smaller in diameter as further moving toward the inner side in the axial direction. In the case of the pipe joint made of resin, a sealing portion may be configured by closely contact only the outer peripheral face of the cylindrical sealing portion 26 with the cylindrical groove 28.

Also in the pipe joint made of resin, in the same manner as the above-described embodiment, the recess 20 is shaped in the diameter-increased root portion 17 of the diameter-increased portion 16 of the tube 3 which is formed by press insertion of the inner ring 4. In this case, the internal thread portion 18 of the union nut 2 is screw-fastened to the external thread portion 9 of the joint body 1, whereby the one end portion 3a of the tube 3 is pressed together with the inner ring 4 against the joint body 1 while causing the pressing edge portion 19a to abut against the recess 20 of the tube 3. At this time, the pipe joint can attain the same effect as that described above, namely, the effect that, when the pressing edge portion 19a is to abut against the diameter-increased root portion 17 of the tube 3, the pressing edge portion 19a can stably and surely abut against and engage with the diameter-increased root portion 17 without sliding thereover, to exert a strong pressing force, and the pipe joint is excellent in prevention of slipping-off of the tube 3.

In the pipe joint made of resin shown in FIG. 6, a tube end receiving face 24 the diameter of which is larger than the inner diameter of the tube 3 is formed on the outer periphery of the front end side of the receiving port 6 of the joint body 1, and the external thread portion 9 the diameter of which is larger than the outer diameter of the receiving face 24 is formed in the outer periphery in rear of the tube end receiving face 24. On the other hand, in the one end portion 3a of the tube 3, the diameter-increased portion 16 is formed by the flaring process, and the diameter-increased root portion 17 where the opposite-insertion direction side inclination 16a of the diameter-increased portion 16 meets a tube outer face 30 which is parallel to the axial direction of the tube is formed. The recess 20 is formed in the diameter-increased root portion 17. A tapered face 29 is formed on the outer periphery of the front end portion of the joint body 1 which corresponds to the inner peripheral face of the opposite-insertion direction side inclination 16a of the diameter-increased portion 16 of the tube 3, so as to extend along the inner peripheral face. A recess 23 corresponding to the recess 20 of the tube 3 may be disposed in the tapered face 29 of the joint body 1 which is opposed to the recess 20.

The one end portion 3a of the tube 3 is connected to the joint body 1 by pressingly fitting the diameter-increased portion 16 onto the tube end receiving face 24. The internal thread portion 18 of the union nut 2 which is previously fitted onto the tube 3 is screw-fastened to the external thread portion 9 of the joint body 1, so that the inner peripheral face of the opposite-insertion direction side inclination 16a of the diameter-increased portion 16 is pressed in the axial direction against the tapered face 29 of the receiving port 6 while causing the pressing edge portion 19a of the union nut 2 to abut against the recess 20 of the tube 3. Also in this case, the recess 20 is shaped in the diameter-increased root portion 17 of the diameter-increased portion 16 of the tube 3. Therefore, the pipe joint can attain the same effect as that described above, namely, the effect that the pressing edge portion 19a of the union nut 2 can stably and surely abut against and engage with the diameter-increased root portion 17 of the tube 3 without sliding thereover, to exert a strong pressing force, and the pipe joint is excellent in prevention of slipping-off of the tube 3.

The joint body 1 of the pipe joint made of resin in the invention is not restricted to a joint body of the socket type which has the receiving port 6 in both axial ends as in the illustrated examples. The invention can be similarly applied to joints of other types, such as the T-type, the elbow type, or the cross type, or a joint which is formed integrally with a fluid apparatus such as a pump.

The entire disclosure of Japanese Patent Application No. 2001-166385 filed on Jun. 1, 2001 including specification, claims, drawings and summary are incorporated herein by reference in its entirety.

What is claimed is:

1. A structure for preventing slipping-off of a tube in a pipe joint made of resin, in which said structure comprises: a joint body (1) which has a receiving port (6) in one end portion, and in which an external thread portion (9) is disposed on an outer periphery of said receiving port; a tube (3) made of resin; and a union nut (2) which is loosely fitted onto an outer periphery of said tube, and in which an internal thread portion (18) that is to be screwed to said external thread portion (9) of said joint body (1) is disposed on an inner periphery, an annular flange portion (19) that is inward projected is disposed on one end, and a pressing edge portion (19a) is disposed in an inner diameter portion of said flange portion, and one end portion of said tube (3) is inserted into said receiving port (6) of said joint body (1) in a state where a diameter-increased portion (16) is formed and a diameter-increased root portion (17) where an opposite-insertion direction side inclination (16a) of said diameter-increased portion meets a tube outer face (30) which is parallel to an axial direction of said tube is formed, wherein a recess (20) is shaped in said diameter-increased root portion (17) of said tube (3), said recess being smaller in radius of curvature or angle than said diameter-increased root portion, said internal thread portion (18) of said union nut (2) is screw-fastened to said external thread portion (9) to cause said pressing edge portion (19a) to abut against said recess (20) of said tube (3), thereby pressing said one end portion of said tube (3) toward said joint body (1), an inner ring (4) having a bulge portion (11a) and a connecting portion (11b) at said one end said recess (20) is shaped into a curved portion (21) which is drawn by a radius of curvature that is smaller than a radius of curvature of said diameter-increased root portion (17).

2. A structure for preventing slipping-off of a tube in a pipe joint made of resin according to claim 1, wherein said recess (20) is shaped into a corner (22) of an angle that is smaller than an angle of said diameter-increased root portion (17).

3. A structure for preventing slipping-off of a tube in a pipe joint made of resin according to claim 1, wherein a recess (23) corresponding to said recess (20) of said tube (3) is disposed in an end portion of said inner ring (4) which is opposed to said recess (20).

4. A structure for preventing a slipping-off of a tube in a pipe joint made of resin in which said structure comprises: a joint body (1) which has a receiving port (6) in one end portion, and in which an external thread portion (9) is disposed on an outer periphery of said receiving port; a tube (3) made of resin; and a union nut (2) which is loosely fitted onto an outer periphery of said tube, and in which an internal thread portion (18) that is to be screwed to said external thread portion (9) of said joint body (1) is disposed on an inner periphery, an annular flange portion (19) that is inward projected is disposed on one end, and a pressing edge portion (19a) is disposed in an inner diameter portion of said flange portion, and    one end portion of said tube (3) is inserted into said receiving port (6) of said joint body (1) in a state where a diameter-increased portion (16) is formed and a diameter-increased root portion (17) where an opposite-insertion direction side inclination (16a) of said diameter-increased portion meets a tube outer face (30) which is parallel to an axial direction of said tube is formed, wherein    a recess (20) is shaped in said diameter-increased root portion (17) of said tube (3), said recess being smaller in radius of curvature or angle than said diameter-increased root portion,    said internal thread portion (18) of said union nut (2) is screw-fastened to said external thread portion (9) to cause said pressing edge portion (19a) to abut against said recess (20) of said tube (3), thereby pressing said one end portion of said tube (3) toward said joint body (1),    an inner ring (4) having a bulge portion (11a) and a connection portion (11b) at said one end, and    said recess (20) is shaped into a curved portion (21) which is drawn by a radius of curvature that is smaller than a radius of curvature of said diameter-increased root portion (17).

5. A structure for preventing slipping-off of a tube in a pipe joint made of resin according to claim 4, wherein said diameter-increased portion (16) of said tube (3) is formed by pressingly inserting said inner ring (4) into said one end portion of said tube (3).

6. A structure for preventing slipping-off of a tube in a pipe joint made of resin according to claim 5, wherein a recess (23) corresponding to said recess (20) of said tube (3) is disposed in an end portion of said inner ring (4) which is opposed to said recess (20).

* * * * *